United States Patent [19]
Marten

[11] 3,884,154
[45] May 20, 1975

[54] PROPULSION ARRANGEMENT EQUIPPED WITH A LINEAR MOTOR

[75] Inventor: Fritz Marten, Erlangen, Germany

[73] Assignee: Siemens Aktiengesellschaft, Munich, Germany

[22] Filed: Dec. 18, 1972

[21] Appl. No.: 315,933

[30] Foreign Application Priority Data
Dec. 23, 1971 Germany............................ 2164078

[52] U.S. Cl....... 104/148 MS; 104/148 LM; 310/12
[51] Int. Cl............................................. B61b 13/08
[58] Field of Search. 104/148 SS, 148 LM, 148 MS; 310/12, 13, 165, 162

[56] References Cited
UNITED STATES PATENTS

| | | | |
|---|---|---|---|
| 3,456,136 | 7/1969 | Pierro | 310/12 |
| 3,594,622 | 7/1971 | Inagaki | 310/13 |
| 3,611,944 | 10/1971 | Reder | 104/148 MS |
| 3,614,496 | 10/1971 | Schiethart | 310/162 |
| 3,638,093 | 1/1972 | Ross | 104/148 LM |

FOREIGN PATENTS OR APPLICATIONS

| | | | |
|---|---|---|---|
| 1,941,613 | 3/1971 | Germany | 104/148 LM |

OTHER PUBLICATIONS

Kemper, Elektrisch angetriebene Eisenbahnfahrzeuge mit elektromagnetischer Schwebefuhrung, ETZ–A, 1 Jan. 53, pp. 11–14.

*Primary Examiner*—M. Henson Wood, Jr.
*Assistant Examiner*—Reinhard J. Eisenzopf
*Attorney, Agent, or Firm*—Kenyon & Kenyon Reilly Carr & Chapin

[57] ABSTRACT

A propulsion arrangement for a body movable along a track defining a direction of motion is disclosed. The arrangement includes a winding carrier assembly which coacts with a ferromagnetic return to develop a propulsion force for moving the body. The carrier assembly has two stacks of laminations carrying windings for developing a travelling wave; these windings are displaced with respect to each other by one pole pitch. The ferromagnetic return includes bars arranged transversely to the direction of motion. The arrangement of the bars constitutes a substantial simplification of the magnetic return and enables a simplified track switch layout to be obtained.

9 Claims, 7 Drawing Figures

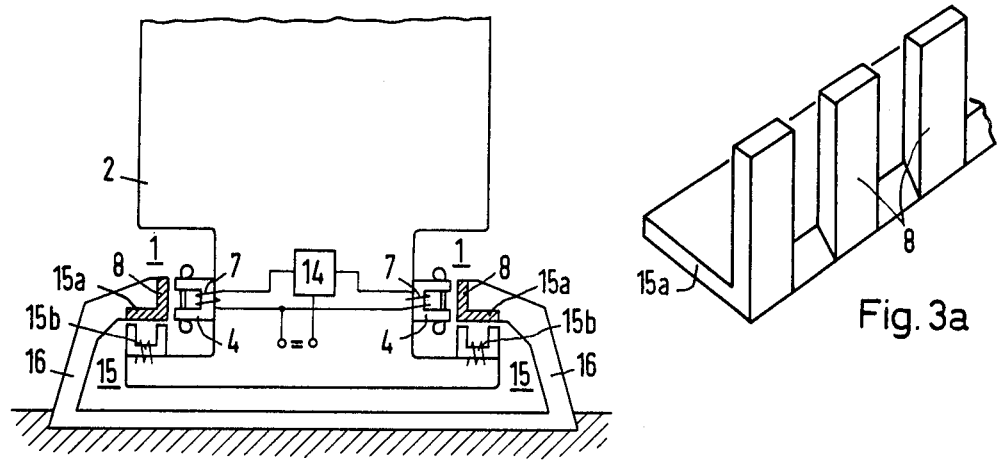
Fig. 3
Fig. 3a
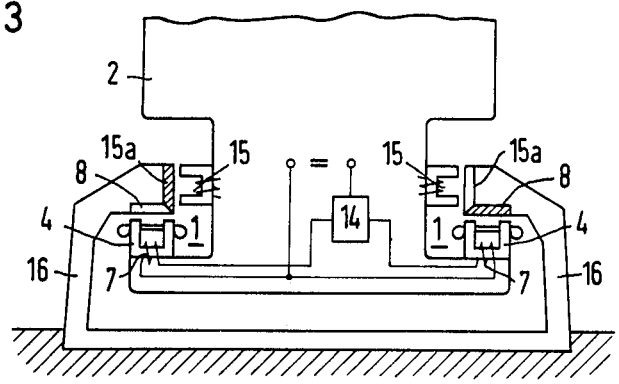
Fig. 4
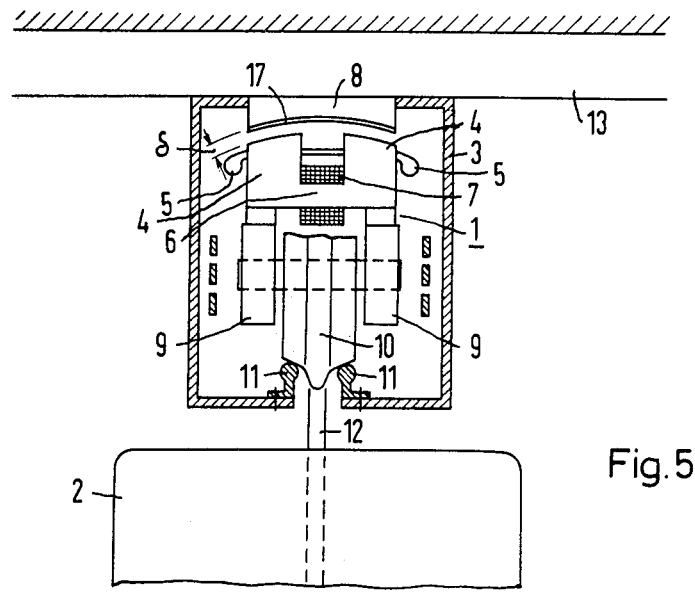
Fig. 5 ated exciter winding. Associated with this assembly, there is a ferromagnetic return arrangement which consists of a flat ferromagnetic rail with mutually displaced square bars formed thereon. However, this arrangement has the disadvantage of having a high manufacturing cost associated with the ferromagnetic return arrangement.

PROPULSION ARRANGEMENT EQUIPPED WITH A LINEAR MOTOR

BACKGROUND OF THE INVENTION

The invention relates to a propulsion arrangement for a body movable along a track which includes a linear motor configured in the manner of a synchronous machine.

Deutsche Offenlegungsschrift 1,941,613 discloses a linear motor having an exciter winding supplied with direct current and arranged on a ferromagnetic winding carrier provided additionally with a three-phase winding. Associated with the winding carrier is a ferromagnetic return arrangement having magnetic and nonmagnetic sections in alternating sequence, the length of the sections corresponding to the pole pitch of the three-phase winding. The field in the air gap is excited by the winding carrying direct current so that the return arrangement (secondary system) can be kept free of windings. According to one configuration, the moving part of the linear motor consists of a U-shaped yoke of solid iron between the legs of which two stacks of laminations, each with a three-phase winding, are disposed so as to be mutually adjacent. The solid yoke carries the exciter winding supplied with direct current. The ferromagnetic return arrangement consists of steel plates which are fastened upright on a concrete roadbed in the lengthwise direction and which extend between the two stacks of laminations with the three-phase windings. The length of the steel plates corresponds here to the pole pitch of the three-phase windings, the distance between two successive steel plates being about equal to their length. With this construction difficulties arise for some applications regarding the layout of the switches and with integration into the suspension and guidance system of movable bodies.

The German journal VDE-Fachberichte, Vol. 26, page 38 (1970), published by VDE-Verlag GmbH, Berlin, discloses a synchronous linear motor having an assembly including a stack of laminations with a three-phase winding and a direct-current exciter winding. Associated with this assembly, there is a ferromagnetic return arrangement which consists of a flat ferromagnetic rail with mutually displaced square bars formed thereon. However, this arrangement has the disadvantage of having a high manufacturing cost associated with the ferromagnetic return arrangement.

In the above-mentioned references linear motors configured according to the claw-pole type are also disclosed. In this motor type, a stack of laminations equipped with a three-phase winding and a ferromagnetic return arrangement associated therewith are constituted by a U-shaped rail with claws, the rail being equipped with direct-current exciter windings. This arrangement has the disadvantages that it is very expensive to accommodate the direct-current exciter windings in the rail-like ferromagnetic return arrangement, and that the U-shaped rail provided with claws can be made only at great expense.

Although in the arrangement disclosed in Deutsche Offenlegungsschrift 1,928,047, the exciter winding is relocated into the winding carrier, this results, in addition to a complex magnetic flux path and an expensive magnetic return arrangement, in a considerable increase of the air gap paths, and therefore in an increase of the magnetization required.

SUMMARY OF THE INVENTION

It is an object of the invention to provide an improved propulsion arrangement equipped with a linear motor. Subsidiary to this object it is an object of the invention to provide with the simplest possible means such a propulsion arrangement with a linear motor which also achieves lateral stabilization and guidance.

A propulsion arrangement of the invention is applicable to a body movable along a track defining a direction of motion. As a feature of the arrangement, a winding carrier assembly is provided which includes two ferromagnetic winding carriers disposed next to each other transversely to the direction of motion. The carriers having respective outermost outside surfaces that extend in the direction of motion and face away from each other; these surfaces are spaced a distance $m$ from each other. A common direct-current excitation winding is mounted on the carriers. As part of the carrier assembly, additional windings are mounted on the winding carriers for developing a travelling wave and are displaced one from the other by one pole pitch $\tau_p$. A ferromagnetic return is provided as part of the arrangement and coacts with the winding assembly for developing a propulsion force for moving the body. The ferromagnetic return includes a plurality of bars arranged in a row transverse to the direction of motion. Each of the bars has a length corresponding to the distance $m$ and has width $b$ having a value defined by the relation: $b \leq \tau_p$. Each two mutually adjacent ones of the bars have a center-to-center spacing corresponding to twice the pole pitch $2\tau_p$.

With the arrangement of the invention, while achieving a stabilizing effect transversely to the direction of motion, there is obtained a simplification of the return members and of the switch layout as well as of the manufacture, and accordingly, a significant savings of material for the ferromagnetic return arrangement.

According to another advantageous embodiment of the invention, force effects occurring perpendicularly to the direction of motion between the ferromagnetic winding carriers and the ferromagnetic return arrangement can be utilized to relieve the rolling, sliding or suspended support arrangements of a moving body, and/or of the guidance arrangements, or even to take these arrangements over completely as in the case where a floating suspension is provided. For this purpose two winding carriers are arranged vertically underneath the return arrangement, so that external forces such as centrifugal forces, inertial forces, the force of gravity and the like, are opposed to the attraction forces between the winding carriers and the return arrangement.

Although the invention is illustrated and described herein as a propulsion arrangement equipped with a linear motor, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

Embodiments of the arrangement of the invention are shown in the following FIGS. described below. Similar or like components are designed by the same reference numeral in each FIG. in which they appear.

FIG. 3 is an elevation view of an upright railroad equipped with two linear motors according to alternate embodiment of the propulsion of the invention.

FIG. 3a is a perspective view of the magnetic return which forms part of the propulsion arrangement of FIG. 3. Here the magnetic return is configured as an angular comb-like rail.

FIG. 4 is an elevation view of an upright railroad wherein the propulsion arrangement is adapted to provide levitation.

FIG. 5 is a propulsion arrangement according to the invention adapted to a suspension railroad.

DESCRIPTION OF THE PREFERRED EMBODIMENTS OF THE INVENTION

Figure 1:
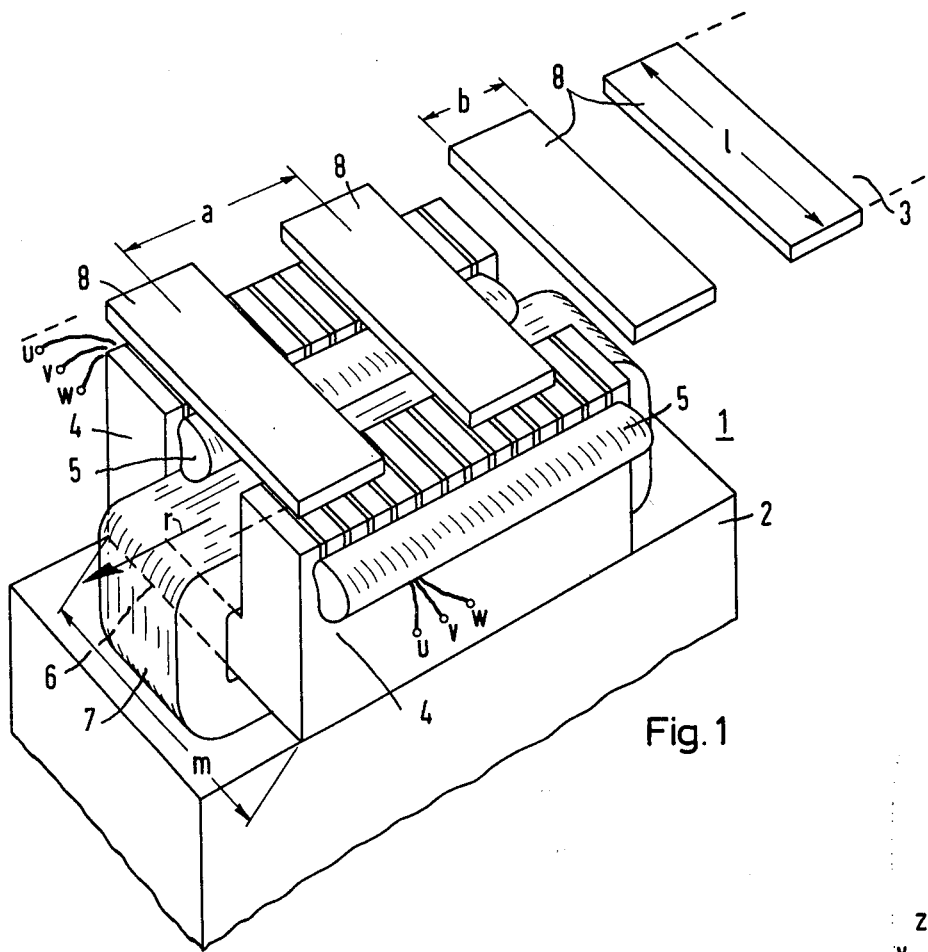
FIG. 1 is a perspective view of the propulsion arrangement according to the invention for a body movable along a track.

In FIG. 1, reference numeral 2 designates a body which is moved along a stationary track 3. The linear motor 1 includes two ferromagnetic winding carriers 4 which are provided with three-phase windings 5 for the purpose of generating a travelling field and which are connected with each other via a magnet yoke 6. The magnet yoke 6 carries an exciter winding 7 which is supplied with direct current. In the propulsion arrangement according to the invention, the two three-phase windings 5 which generate the travelling field are situated side by side transversely to the direction of motion $r$, but are displaced relative to each other by one pole pitch $\tau_p$.

Figure 2:
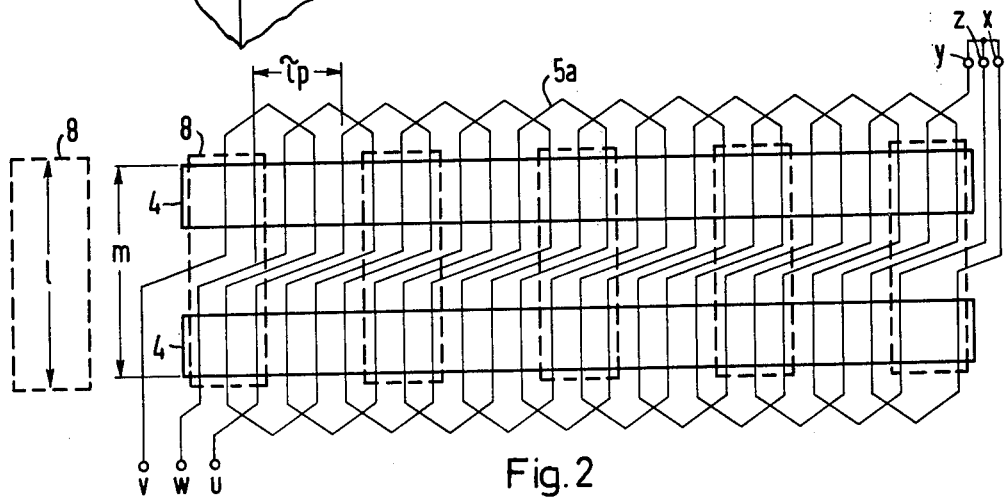
FIG. 2 is an electrical schematic diagram of the winding of the linear motor arranged as a single three-phase winding.

As shown in FIG. 2, a single three-phase winding $5a$ with winding branches displaced by one pole pitch $\tau_p$ can be used instead of two three-phase windings. The Y-connected three-phase winding has terminals U,V,W and X,Y,Z. The ferromagnetic return is formed by flat iron bars 8 which are arranged transversely to the direction of motion $r$ and have a width $b$ which is smaller than or equal to the pole pitch $\tau_p$. The center-to-center spacing $a$ of the iron bars 8 corresponds to twice the pole pitch, $2\tau_p$. The length $l$ of the iron bars 8 corresponds to the outside distance $m$ of the two ferromagnetic winding carriers 4.

In the arrangement shown in FIG. 3, two linear motors 1 serve to propel a car 2 of an upright railroad. For support, an arrangement 15 equipped with rail-like direct-current magnets is provided. The ferromagnetic return arrangements for the lift magnets $15b$ and for the winding carriers 4 of the linear motor 1 are preferably combined in one structural unit; these return arrangements are mounted at the lateral supports 16 of a roadbed. As shown in FIG. 3a, the iron bars 8 of the propulsion system may form here with the steel rail $15a$ of the support system 15 a comb-like angular rail.

The direct-current exciter winding 7 of the linear motors (FIG. 3) is fed via a control device 14 which maintains the air gaps of both linear motors constant. Whereas the support systems 15 take over additionally a lateral stabilization function, the linear motors act additionally as stabilizers in elevation.

In the upright railroad shown in FIG. 4, the force effects occurring vertically to the direction of motion between the ferromagnetic winding carriers 4 and the ferromagnetic return arrangement 8 are utilized to achieve levitation; this being in addition to the propulsion effect of the linear motors 1. Stabilization in elevation is taken over by direct-current magnets $15b$ which cooperate with the return rail $15a$ (comb-like angular rail).

In the suspension railroad shown in FIG. 5, a beam serves as the track 3; this beam is made, for example, of steel and is configured to have a slotted box-like section. The beam is laterally supported by overhead cross members 13. The truck 9 of this suspension railroad has a flanged wheel 10 with a central flange arranged adjacent to tread surfaces on both sides. This flanged wheel runs on rails 11 arranged in the track beam 3. A cabin 2 is resiliently connected with the truck 9 via rods 12. At the truck 9 is further attached the part of a linear motor 1 which is provided with the windings 5 and 7. The two ferromagnetic winding carriers 4 and the ferromagnetic return arrangement 8 are arranged vertically one above the other, so that external forces are in a direction opposite to the attraction forces between the winding carriers 4 and the ferromagnetic return arrangement 8. Because of the vertical force effect which is present in addition to the propulsion force, the load between the wheel 10 and the rails 11 is relieved (which reduces wear and noise considerably).

Because of wind and centrifugal-force effects, the cabin 2 oscillates about the contact points between the wheel and the rails. As a consequence thereof, the ferromagnetic winding carriers 4 acquire a position asymmetrical relative to the ferromagnetic return arrangement 8 which results in a force which acts opposite to the deviating excursion and returns the winding carriers 4 into the rest position.

The surfaces of the ferromagnetic winding carriers 4 and of the ferromagnetic return arrangement 8 defining the air gap are preferably made in the shape of an arc, so that the air gaps $\delta$ are held at least approximately constant in the event of an oscillatory motion.

To achieve a large torque of the linear motor 1 during starting, the bars 8 are covered with a layer of electrically highly conductive material, for example, aluminum. It is particularly advantageous to bridge the bars 8 by a ribbon 17 of highly electrically conductive material. This ribbon 17 serves at the same time as a continuous upper cover of the box profile 3.

Figure 6:
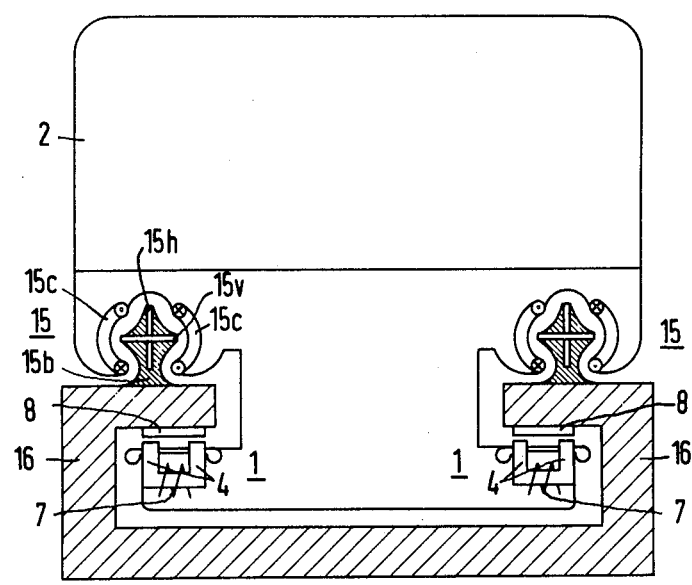
FIG. 6 is still another embodiment of the propulsion arrangement of the invention adapted to an upright railroad.

A particularly advantageous embodiment of the invention is obtained if the lifting properties of the linear motor 1 are exploited through a combination with an electrodynamic zero-flux system 15 as the support and/or guidance system (FIG. 6). At two lateral supports 16 of a roadbed, the ferromagnetic return bodies of a linear motor 1 are mounted, these return bodies being configured as bars 8. The winding carriers 4 of the linear motors are mounted vertically underneath the bars 8 on the vehicle 2. Also mounted on the vehicle are two superconducting conductor loops $15c$. Two stabilization loops or rails $15h$ and $15v$ at the support 16 are associated with the loops 15c for generating guidance forces. The stabilization arrangement 15h serves to generate horizontal guidance forces and the stabilization arrangement 15v develops the lift forces. Stabilization arrangements 15h and 15v are embedded in a body 15b in such a way that their cross sections form a cross. In the example shown, the linear motor 1 relieves the stabilization arrangement 15v by generating additional lift forces, while simultaneously providing propulsion, in such a manner that the stabilization arrangement 15v is situated to the extent possible in the zone of the two superconducting conductor loops 15c whereat the magnetic flux is zero and that the losses and braking forces are kept as small as possible.

What is claimed is:

1. A propulsion arrangement for a body movable along a track defining a direction of motion, the body being subjected to outer forces such as centrifugal forces, comprising a winding carrier assembly including two ferromagnetic winding carriers disposed next to each other transversely to the direction of motion, said carriers having respective outermost outside surfaces extending in the direction of motion and facing away from each other, said surfaces being spaced a distance m from each other, a common direct-current excitation winding mounted on said carriers, additional windings mounted on said winding carriers for developing a travelling wave, said additional windings being displaced one from the other by one pole pitch $\tau_p$; and ferromagnetic return means for coacting with said winding carrier assembly for developing a propulsion force for moving the body, said ferromagnetic return means comprising a plurality of ferromagnetic bars arranged in a row transverse to the direction of motion, each of said bars having a length corresponding to said distance m and being a width b having a value defined by the relation: $b \leq \tau_p$, and each two mutually adjacent ones of said bars having a center-to-center spacing corresponding to twice said pole pitch $2\tau_p$, said ferromagnetic winding carriers being positioned relative to said ferromagnetic return means so that the attraction forces developed between said winding carriers and said return means are opposed to the outer forces, and an electrodynamic guidance system having a support and guidance arrangement equipped with conductor loops for generating a flux having a low loss zone of zero flux value, said support and guidance arrangement also having a stabilization arrangement, said electrodynamic guidance system and said winding carrier assembly together with said return means being arranged relative to each other so as to cause the lift component of the forces developed between said carrier assembly and said return means to act to maintain said stabilization arrangement in said zone.

2. The propulsion arrangement of claim 1, said additional windings constituting a single set of three-phase windings having winding branches displaced from each other by one pole pitch $\tau_p$.

3. The propulsion arrangement of claim 1, said additional windings constituting two three-phase windings disposed one next to the other transversely to the direction of motion and displaced one from the other by one pole pitch.

4. The propulsion arrangement of claim 1 comprising an electrodynamic suspension and guidance system having a ferromagnetic return structure, said return means and said return structure being configured as a unitary structure.

5. The propulsion arrangement of claim 4, said unitary structure being an angular comb-like rail.

6. The propulsion arrangement of claim 5, the tines of said comb-like rail being said ferromagnetic bars.

7. The propulsion arrangement of claim 1, said ferromagnetic bars having respective surfaces adjacent said winding carriers, the arrangement comprising a layer of good electrically conductive material covering said surfaces of said bars.

8. The propulsion arrangement of claim 7, said layer being a ribbon of good electrically conductive material bridging said bars.

9. The propulsion arrangement of claim 1, said ferromagnetic winding carriers conjointly defining a U-shaped member, said direct-current excitation winding being mounted on the bight portion of said U-shaped member, and said additional windings being mounted on the leg portions of said U-shaped member.

* * * * *